United States Patent Office 3,388,648
Patented June 18, 1968

3,388,648
PHOTOGRAPHIC CAMERA WITH EXPOSURE
METER OR EXPOSURE CONTROL DEVICE
Heinz Thiele, Leinfelden, near Stuttgart, and Horst Rockstroh, Stuttgart-Mohringen, Germany, assignors to Zeiss Ikon Aktiengesellschaft, Stuttgart, Germany
Filed June 25, 1965, Ser. No. 466,938
Claims priority, application Germany, July 16, 1964,
Z 10,970
4 Claims. (Cl. 95—11)

ABSTRACT OF THE DISCLOSURE

A photographic camera is provided with an exposure determining device, and a device for the scanning of one or several marks introduced with the insertion of a film magazine into the camera, which marks are releated to the exposure characteristics of the film. A selector switch and an actuating member are provided which introduce other exposure factors independently of the film, such as the exposure time, bad-weather correction or the like, into the exposure determining device of the camera. The entire servicing manipulation of the camera is concentrated at a predetermined place of the camera casing.

---

The invention relates to a photographic camera such as a motion picture camera provided with an exposure meter or exposure control device, and a device for the scanning of one or several marks introduced with the insertion of the film into the camera, the mentioned marks giving information as to the exposure characteristics of the inserted film.

Known devices of this type operate with recesses or similar marks provided on the film magazine or roll film cartridge, batteries or the like and these marks are mechanically scanned. The scanning movement is then transferred by means of frequently complicated transfer devices from the scanning point to the camera part, which must be adjusted for the purpose of utilization of the scanned information. The transfer involves difficulties particularly then when the marks to be scanned for constructive reasons must be disposed far removed from the camera part to be adjusted.

It is an object of the invention to overcome this disadvantage by simple means, which additionally are adapted to transfer also other exposure factors independently of the film, such as the exposure time, bad-weather-correction or the like, into the exposure meter- or exposure control-device of the camera. The means to be found according to this object are to assist in fulfilling the further requirement necessary, according to which preferably the entire servicing manipulation of the camera is to be concentrated at a preferred place of the camera casing.

In accordance with the object of the invention, a member scanning the mark or marks controls directly electrical contact-combinations, through which the desired or available exposure characteristics, such as type of film and film speed, may be passed into the camera parts making use of these information data. The information furnished by the film-type-mark may for example control an operating circuit for the application and removal of a light filter. The contact-combination in accordance with the invention, for the introduction of the information as to the speed of the film consists preferably of a resistance body and one or several contact elements operating together with the same, and this arrangement is developed further for introducing additional exposure factors, such as exposure time, bad-weather-correction and the like. For this purpose, according to the invention, either the resistance body itself may be slidably arranged or a sliding contact additionally thereto may be provided to be movably disposed independently of said resistance body.

In the following the invention will be described in more detail in connection with several embodiments from which further objects may be recognized. In this connection it has been avoided to show in the drawings details not essential for the invention, in order to permit the objects of the invention to appear particularly clear.

Figure 3:
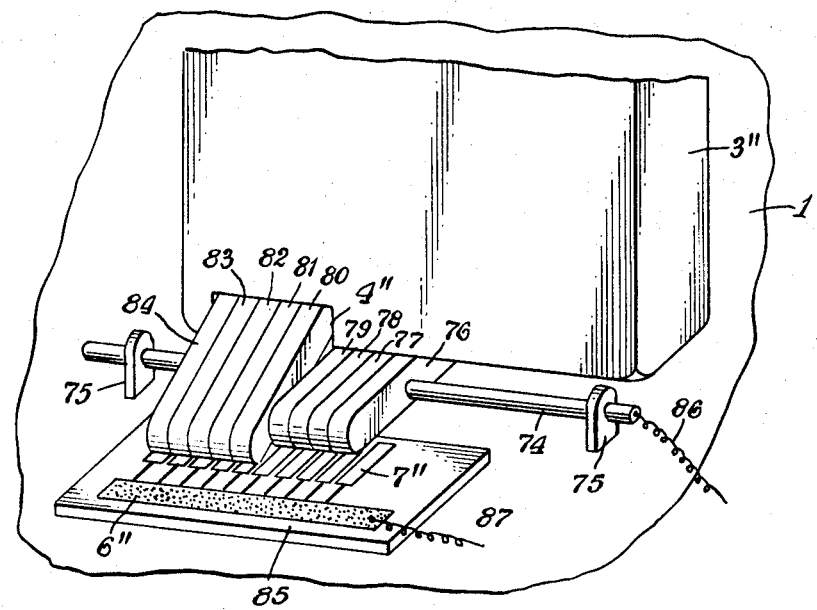
Figure 4:
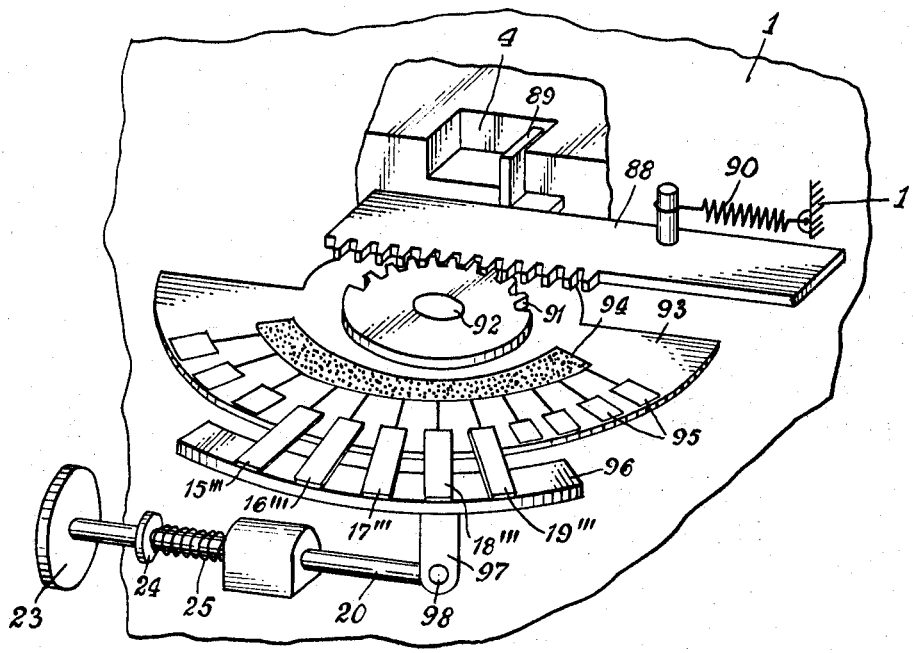

FIG. 3 discloses an embodiment with a multiple-part scanning member for the control mark, and FIG. 4 is a perspective view of a device according to the invention with an arcuately shaped resistance body.

Figure 1:
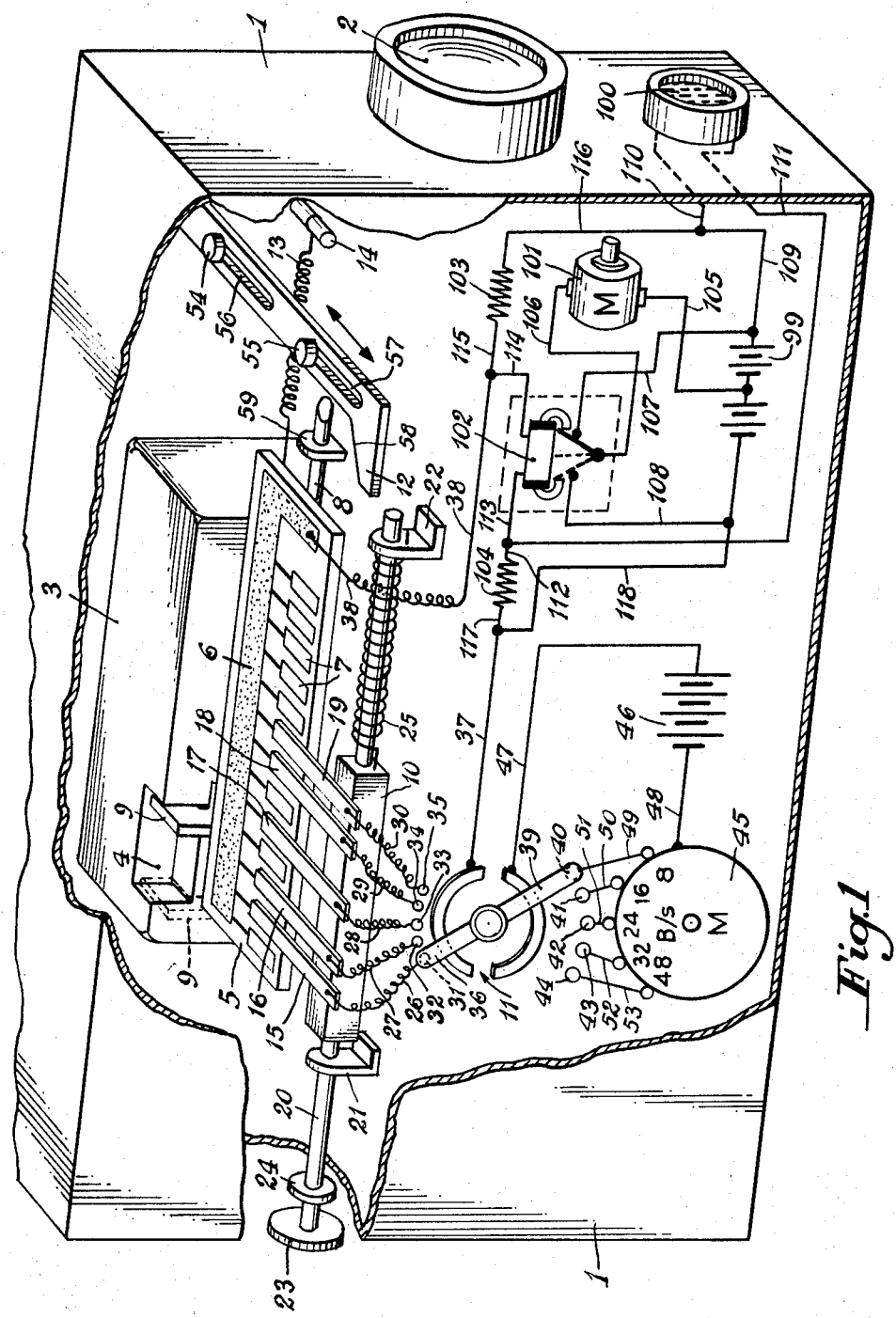
FIG. 1 is a perspective view of a first embodiment of a camera of the invention with parts broken away to disclose the interior parts.

Referring to FIG. 1 the embodiment disclosed by way of example comprises a camera casing 1 with a camera objective 2 on its front wall and having inserted therein a film magazine 3 with a recess 4. The camera casing 1 also contains a flat strip 5 with a resistance body 6 and contact terminals 7 disposed adjacent said resistance body 6 and conductively connected therewith and also has a control pin 8 and an abutment tab 9 thereon. A slidable head 10 extends parallel to said flat strip 5 and carries conductive leaf springs 15, 16, 17, 18 and 19 connected with a selector switch 11. The flat strip 5 is under influence of a spring 13 one end of which is attached to a pin 14 fixed to the casing 1. The slidable head 10 with said series of laterally extending leaf springs 15 to 19 thereon is carried by a rod 20 slidable parallel to the resistance body 6 on the strip 5. The rod 20 is slidably supported in axially spaced bearings 21 and 22. Furthermore, it carries on one end which projects from the rear wall of the camera casing 1 an actuating knob 23 and within the camera casing an abutment ring 24. A helical torsion spring 25 surrounds the rod 20 between the slidable head 10 and the bearing 22 with such initial tension that it urges the rod 20 with the slidable head 10 outwardly toward the rear wall of the camera casing in such manner, that the abutment ring 24 engages the inside of rear wall of the camera housing and on othe other hand constantly presses the leaf springs 15 to 19 on the head resiliently against the contact-terminals 7.

Electric conductors 26 to 30 lead to the contacts 31 to 35 of the selector switch 11, and are engaged each according to adjustment of a rotatable arm 36 of the selector switch 11, to be electrically connected with an electric conductor 37, which leads to the bridge-system of an exposure-meter or similar exposure determining device of known type. The other necessary electrical connection with the bridge system is produced by an electrical conductor 38 connected with the resistance body 6.

The part of the exposure-meter- or control-device, respectively, to which lead the electric conductors 37 and 38, consists of a battery 99, a control-body 100 containing a photo-resistance and a shutter, a servomotor 101 for the adjustment of the shutters of the objective 2 and the control body 100, a relay 102 for the light-dependent reversal of the direction of rotation of the servomotor 101, and two fixed resistances 103 and 104.

The feed circuit for the servomotor 101 is completed through an electric conduit 105 by a center tap on the battery 99 for the servomotor 101, and electric conduit 106 from the servomotor 101 to the center contact of the relay 102, and according to the necessary direction of rotation of the servomotor through an electric conduit 107 or an electric conduit 108 from a particular one of the relay contacts to the battery 99.

The switch-setting of the relay 102 is controlled by means of a bridge-circuit which is likewise energized by the battery 99. In this bridge-circuit there are included in addition to the battery 99 the photo-resistance in the control body 100, the relay 102 and fixed resistances 103 and 104 as well as, connected by means of the electric conductors 37 and 38, the regulatable resistance with the resistance path 6. For the electric connection serve here in addition to the electric conductors 37 and 38 the electric conductors 109 to 118, inclusive.

Simultaneously with the slider 36 a second rotatable slider 39 of the selector switch 11 moves over a series of contacts 40 to 44. Depending upon the setting, each of these contacts then closes the supply circuit of a motor 45 from a battery 46 through electric conductors 47, 48, and one of the electrical conductors 49 to 53, to which are alotted the picture frequencies 8, 16, 24, 32, and 48 frames or pictures per second (p./s.).

A flat control slide member 12 extends transversely to the flat strip 5 and is slidably supported by the bodies of guide screws 54 and 55 passing through elongated holes 56 and 57 of the member 12 within the range of movement of one end of the control pin 8. The slide member 12 is provided at one end with a cam surface 58, which cooperates with the mentioned end of the control-pin 8, when the flat slide-member 12 is moved through an aperture in the not-disclosed cover of the camera casing, or its locking mechanism. In order that the guidance of the resistance carrying strip 5 and of the control pin 8 be stable, particularly in the vicinity of the cam surface 58, there is provided additionally for the support lengthwise movable flat strip 5, a small bearing-block 59 which guides the control pin 8. This bearing block 59 is fixedly attached to the camera casing.

The operation of the device according to this first embodiment of the invention in accordance with FIG. 1, is as follows:

When the camera cover is opened the control slide-member 12 is moved into one of its end positions, in which its control cam 58 has pressed the control pin 8 and with it the strip 5 against the action of the spring 13 into its initial position (dotted-line position of the abutment tab 9). The film magazine 3 is inserted, whereby its recess 4 is disposed in the scanning range of the abutment tab 9 on the strip 5, and the tab 9 projects into the recess 4. Upon closure of the camera cover or upon its locking, the guide-slide-member 12 is moved into its other end position, as shown in full lines in FIG. 1. In doing this the control pin 8 slides over the control cam 58 until the tab 9 engages the forward limiting edge of the recess 4 and is stopped. This forward surface of the recess 4 accordingly determines the relative position between the resistance body 6 on the strip 5 and the slidable-spring-head 10. The length of the recess 4 in the film magazine 3 or the position respectively of its forward limiting surface serving as an abutment, is, however, an indication of the speed of the film inserted in the magazine. Therefore, the abutment position so found corresponds to the resistance value, which must be tapped on the resistance body 6, so that the speed of the film employed may be taken into consideration during the exposure-meter-measurement or the exposure control operation.

The selection of the exposure time, expressed here by the picture frequency, takes place by means of the selector switch 11. The second slide-member 39 is adjusted to one of the contacts 40 to 44, and thereby one of the picture frequencies selected. In order that also the selected exposure time be considered during the exposure-meter- or exposure control operation, simultaneously with the movement of the second slide-member 39, the slide-member 36 selects the corresponding one of the leaf springs 15 to 19. The latter adjust on their part on the resistance body 6 the resistance value, which in the exposure-meter- or exposure control-circuit incorporates the speed of the inserted film and the selected exposure time (picture frequency) in the total value.

If a bad-weather-correction must be made then the tapped position of the leaf springs 15 to 19 is shifted along the resistance body 6. The resistance value corrected in this manner incorporates in the exposure-meter-measurement or in the control-circuit, not only the film speed and the picture frequency, but also a correction for bad-weather.

The introduction of the bad-weather-correction takes place by means of pressing of the actuation knob 23. This causes the slidable spring-head 10 with its leaf springs 15 to 19 thereon to move over the rod 20 and against the action of the spring 25 until the abutment ring 24 engages the bearing 21. The electric conductors 26 to 30 are flexible and follow this adjusting movement.

Figure 2:
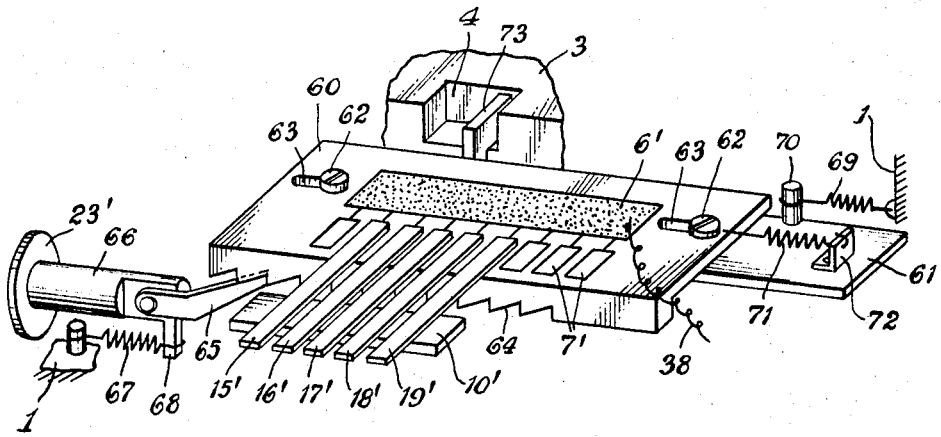
FIG. 2 is a perspective view of a portion of a modification of the embodiment disclosed in FIG. 1.

FIG. 2 illustrates a modified embodiment of the invention in which the leaf spring carrying head 10' is fixedly mounted in the camera casing. The resistance-body 6' and the series of contact terminals 7' are disposed on a longitudinal plate 60, which is disposed lengthwise movable on a slide member 61. The slidable movement of the plate 60 on the slide-member 61 and a limitation of its relative movement is insured by means of guide screws 62 extending through elongated holes 63 in the plate 60. The plate 60 is provided on its lower face with rack teeth 64, which cooperate with a resilient pawl 65, on a slidably mounted pin 66 carrying the actuating knob 23'. The pin 66 is constantly urged by a spring 67 outwardly of the camera casing. The spring 67 with one end is attached to a pin in the camera housing 1, and with its other end is attached to a projection 68 on the pin 66. Another spring 69 is attached with one end to the camera casing and with its other end to a pin 70 on the slide member 61, while still another spring 71 is tensioned between the plate 60 and projection 72 of the slide member 61.

The abutment tab 9 of FIG. 1 is replaced in this modification by an abutment tab 73 provided on the slide-member 61.

In this modified embodiment as shown in FIG. 2, also three exposure factors may be taken into consideration at the same place of the camera. In contrast to FIG. 1, here, however, the electrical conductors 26 to 30 connected to the leaf springs 15', 16', 17', 18' and 19' may be rigid.

The film speed mark, introduced into the exposure measurement by means of the recess 4 in the film magazine 3, is scanned by the slide-member 61 with the aid of its abutment tab 73. In this arrangement the plate 60 moves with the slide-member 61.

The introduction of the exposure time, namely the picture frequency takes place in the same manner as in the embodiment disclosed in FIG. 1.

For the introduction of a bad-weather-correction the actuating knob 23 is pressed inwardly whereby the pin 66 causes the spring pawl 65 to engage the rack teeth 64 so that the plate 60 is moved relative to the slide-member 61. The screws 62 and the length of the elongated holes 63 determine the size of the shifting movement according to the necessary correction factor.

FIG. 3 shows by way of example an embodiment of the invention with a scanning of the recess 4'' in the film magazine 3'' which deviates from the previous form. For the purpose of simplifying the disclosure of this embodiment, the recess 4 is disposed on the lower edge of the film magazine 3''. On a rod 74 which rests in the bearings 75 fixed to the housing, a number of resilient contact fingers 76 to 84 are pivotally mounted. These contact fingers 76 to 84 are constructed as double-levers, which may engage with one of their lever arms the bottom wall of the film magazine. Within the range of movement of the other lever arms of these double-levers are disposed the contact points of the contact terminals 7'' of the resistance body 6", which are here disposed on a slidable plate 85.

The disclosure according to FIG. 3 is completed by electrical conductors 86 and 87, which lead to the bridge-system of the exposure-meter- or the exposure control device of known type.

The recess 4", which represents the speed of the film stored in the magazine 3" is engaged by all resilient contact fingers located in its range, for example the ones covering 80 to 84, and engage the contact-terminals 7" lying in their range of movement. The illustrated part of the exposure-meter- or exposure control-circuit is thereby closed by the electric conductor 86, the rod 74, the resilient contact finger 80, the contact terminal 7" engaged by the latter, the part of the resistance body 6" lying between this contact point and the electric conductor 87, and the electric conductor 87. The introduction of exposure time (picture frequency) and the bad-weather-correction-values take place by means of shifting the slide-plate 85 along the corresponding resistance-sections.

The embodiment of the invention disclosed by way of example in FIG. 4 is principally the same as the embodiment disclosed in FIG. 1.

A rack bar 88 enters with its abutment tap 89 the recess 4 in the film magazine 3, under the action of a spring 90 tensioned between it and the camera casing 1. This movement of the rack bar 88 is transmitted by a pinion 91 to a shaft 92, which is fixedly attached to a circular disc 93 which forms the carrier for a resistance body 94 of circular form, corresponding to the resistance body 6 with which are associated a number of circularly disposed contact terminals 95 corresponding to the contact terminals 7 of FIG. 1. The slidable spring head 10 according to FIG. 1 is replaced by a rotatable segment 96, which carries the leaf springs 15''' to 19''' in radial arrangement. The rod 20 with the actuating knob 23, the abutment ring 24 and the spring 25 is operatively connected by a pin 98 with an eye-let 97 on the lower face of the moveable-segment 96.

The operation of the arrangement disclosed in FIG. 4 corresponds to that of the arrangement shown in FIG. 1. The abutment tap 89 enters the recess 4 and is caused to engage the forward one of the two end walls of the same, whereby the position of the rack bar 88 is determined. In this manner is adjusted the resistance-body 94 with the disc 93 in the position corresponding to the speed of the film stored in the film magazine 3. The resistance body 94 is scanned according to position of the selector switch 11, which is used to adjust the camera to the selected exposure-time or picture frequency. The bad-weather-correction takes place by pressing the actuating knob 23, which swings the arcuate segment 96 with the conductive leaf springs 15''', 16''', 17''', 18''' and 19''' thereon coaxially to the shaft 92 a corresponding amount.

What we claim is:
1. A photographic camera with an exposure determining device comprising in combination:
(a) a camera casing having mounted therein
(b) a scanning device for introducing into said exposure determining device the film speed of the film in a magazine inserted into said camera casing by causing said scanning device to engage a predetermined mark provided on said magazine,
(c) said scanning device including a scanning member for controlling a plurality of electrical contact combinations which in addition to the introduction of said film speed into said exposure determining device introduce other exposure influencing factors, including the picture frequency and the type of film which is in said magazine,
(d) said plurality of electrical contact combinations including an electric resistance member and a plurality of contact members in conductive engagement therewith, said contact combinations being also electrically connected with said exposure determining device,
(e) asid contact members being connected with said electric resistance at points spaced from each other, said points of connection corresponding to the different picture frequencies to which the camera is adjustable, and
(f) a selector switch connected with said contact members for selectively connecting anyone of the latter eletcrically with said exposure determining device.

2. A photographic camera according to claim 1, including means for additionally adjusting the entire series of contact members relatively to said resistance for introducing a bad weather factor into said exposure determining device.

3. A photographic camera according to claim 1, including means for slidably adjusting said electric resistance for introducing a bad weather factor into said exposure determining device.

4. A photographic camera according to claim 1, in which said scanning member comprises a plurality of contact fingers pivotally mounted adjacent of each other on a common rod and of which the ones opposite said mark which is formed by a recess in said film magazine are caused to enter said recess so as to engage a respective portion of said resistance and thereby determine the picture frequency to be electrically transferred into said exposure determining device.

References Cited

UNITED STATES PATENTS

| | | | |
|---|---|---|---|
| 2,186,611 | 1/1940 | Martin | 95—10 |
| 2,493,928 | 1/1950 | Rath | 352—78 XR |
| 3,125,939 | 3/1964 | Bundschuh et al. | 95—10 |
| 3,165,990 | 1/1965 | Kiper et al. | 95—10 |
| 3,176,599 | 4/1965 | Anwyl | 95—10 |
| 3,194,133 | 7/1965 | Benson | 95—10 |
| 3,266,395 | 8/1966 | Kremp et al. | 95—10 |

NORTON ANSHER, *Primary Examiner.*

F. L. BRAUN, *Assistant Examiner.*